Aug. 19, 1969  A. JOHANSEN  3,461,570
TEACHING DEVICE
Filed Dec. 7, 1964  3 Sheets-Sheet 1
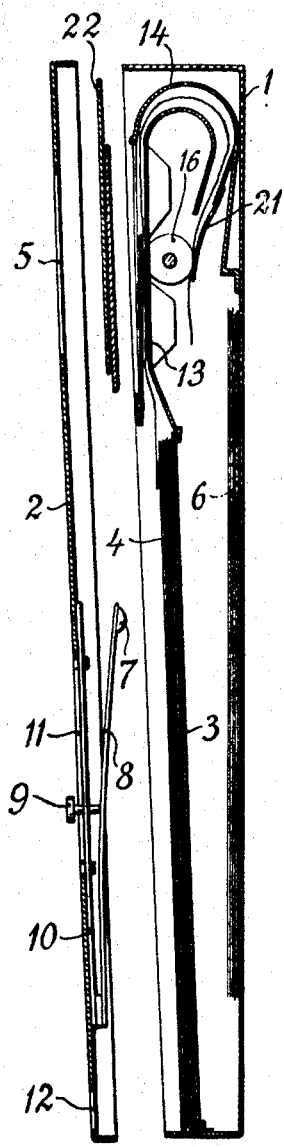
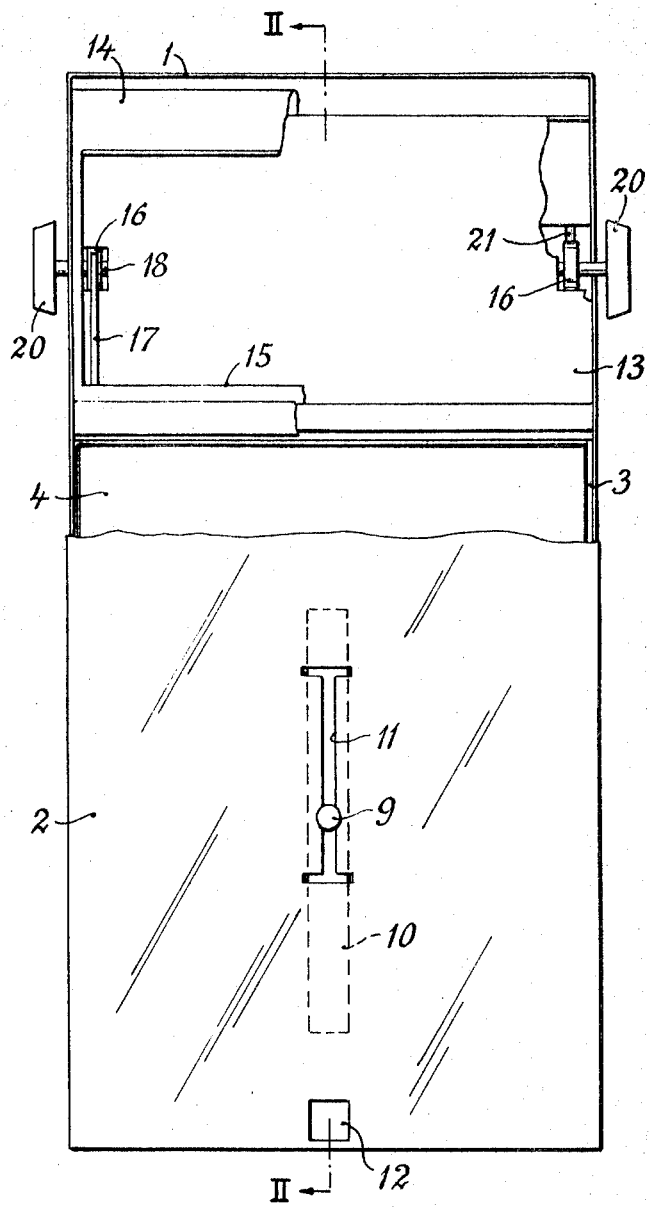
INVENTOR
ARNFINN JOHANSEN
By Linton and Linton
ATTORNEYS

3,461,570
TEACHING DEVICE
Arnfinn Johansen, Ammerudveien 5, Oslo, Norway
Filed Dec. 7, 1964, Ser. No. 416,267
Claims priority, application Norway, Dec. 23, 1963,
151,374/63
Int. Cl. G09b 1/04
U.S. Cl. 35—9       5 Claims The present invention relates to a teaching device comprising a lockable case holding means for transporting sheet material having visible educational matter such as a text which may include problems, the said material being advanced past a reading area which may include a writing area, by a feeding means which is only capable of moving the material forwards, the whole being contained in a case.

In such devices the carrier may for instance consist of a flexible web or strip of great length which is fed forward from one roll to another. However, it is difficult to print the visible educational matter, e.g. a text, on such a long strip in existing printing machines. Inter alia for this reason it is often preferred to print the educational text on a stack of sheets which are advanced one at a time past the reading area. Unless specifically stated the present invention relates to teaching devices or teaching machines comprising means for transporting visible educational matter, irrespective of whether the means consists of a web or strip of great length or separate sheets stacked within a case. However, some aspects are especially related to teaching machines in which the carrier consists of a stack of separate sheets.

In general the reading area is covered by a transparent plate of for instance glass or transparent plastic material. However, certain parts of the reading area may be without a cover glass, thereby providing a writing area for entering of answers and solutions to problems presented in conjunction with the visible educational matter. The correct solution or answer may be indicated further down on the strip or sheet, so as to be made visible only when the location designated for the student's written answer has passed the open writing area. In order to prevent the student from moving the transporting means backwards and correcting his answers, the feeding means, which is operable by a rotating operating knob outside the case, is only capable of moving the strip forwards. Even if the correct answer is not given immediately, it is desirable that the strip or sheet is movable only in the forward direction past the reading area as this prevents the student from returning the text, the assimilation of which is tested by the problems, to the reading area by turning the operating knob. A writing opening forming part of the reading area is not always necessary or desirable, since the educational matter (the so-called program) may then be kept intact and used several times. Any problems may in that case be answered on a separate paper. Also in this case it will be understood that for pedagogic reasons it may be desirable if a certain part of the strip or sheet containing the program cannot be moved back into the reading area after having passed this area.

The position and size of the reading area and the writing opening, if any, determine the position on the strip or sheet of the educational matter including the problems, and also the position of the answers. In some cases the restrictions in the arrangement of an educational text imposed thereby may make it more difficult for a teacher to work out his own programs adapted for a certain class or school.

When the educational matter, e.g. a text, is printed on separate superimposed sheets in a stack within a lockable case and these sheets are advanced one at a time, it may happen that the feeding means will catch more than the top sheet. Thus for instance the two uppermost sheets may be caught and advanced simultaneously past the reading area. The lower one of these sheets is, of course, not visible, and the student will not notice that two sheets have been advanced simultaneously, until the next sheet becomes visible in the reading area. He will then discover that the presentation is not coherent and/or that he can no longer follower the explanations given or answer the problems presented, because a certain section of the educational text is lacking. If the teaching device is used in a class where a teacher is present, the latter may unlock the device and place the sheets which have been unintentionally advanced, back into the starting stack. In larger classes this may entail a great burden upon a teacher and cause interruptions in the teaching. When the teaching device is used in the student's home (correspondence courses) it will be still more complicated to correct the error which has occurred, because, as previously stated, the device must be lockable in order to make the interior of the device inaccessible to the student.

In order to make the feeding means non-reversible it is known to use a pawl mechanism which engages a ratchet so as to block the rotatable operating member against rotation in one direction. Such a ratchet gear is a source of noise and would therefore disturb other persons who might be present in the same room as the student. It will be understood that when the students of a large class are all simultaneously using devices having a blocking means of this type the noise level will be very high.

An object of the present invention is to provide a teaching device which may be operatively connected to an apparatus for acoustically reproducing educational matter, e.g. a tape player or other player for magnetically recorded sound playing educational texts related to the part of the program-carrying strip or sheet just described.

Another object of the present invention is to provide a teaching device allowing the student at an early stage of the advancement of a sheet to ascertain whether only one or more than one sheets have been advanced. It is further an object to provide a device of the kind referred to above which permits the student himself to return the sheets to the starting position without opening the lockable case and before any essential part of the sheet has passed the reading area, if it is established that more than one sheet has been started.

A further object of the present invention is to provide a teaching device having a feeding means which, when operated by a rotatable operating knob outside the case, can only advance the strip or sheet forward, and which comprises a simple, reliable and substantially noiseless coupling between the feeding means and the rotatable operating knob.

A still further object of the present invention is to provide a teaching device permitting the shape and the size of the reading area to be changed so as to adapt it for different program-carrying webs.

A device in accordance with the present invention comprises a lockable case containing means for transporting sheet material for visible educational matter which may include problems, the said material being advanced past a reading area including a writing area if desired, by a feeding means which is only capable of moving the sheets forward, and is primarily characterized by means which respond to markings on the sheets in order to start an acoustic or other apparatus for reproducing acoustic or other educational matter.

This provides a teaching device permitting the student to be taught independently of other students both by a visible text as in ordinary teaching machines and also in other ways, for instance acoustically or verbally, the advantages involved in the teaching by teaching machines being maintained for all of the lesson or program, i.e.

also for the verbal part of the lesson. Thus, in the teaching device of the present invention all parts of the program are so coupled together that their sequence is definitely determined, that problems presented must be answered at the desired stage of the program, and that it is not possible to go back to an earlier stage of the program.

When the acoustic reproducing apparatus, for instance a tape player of the present invention, has reproduced the part of the lesson relevant to the text just studied in the reading area, it must be stopped, for instance by a timed interrupter. However, in accordance with the present invention the acoustic means carrying the reproduced matter, i.e. the tape in a tape player, or the wire in a wire player, also carries a signal, a marking or the like, which causes the acoustic reproducing apparatus to stop and not to be started anew until it again receives a starting order resulting from the sensing of another marking on the program strip or sheet. This affords a greater flexibility and a better utilization of the means carrying the further educational matter, for instance the tape.

It will be understood that the present invention basically consists in that a teaching machine having means for transporting visible educational matter is so coupled to an acoustic reproducing apparatus that the latter is controlled by the transporting means so as to be in operation only at pre-determined stages of the program. The present invention especially contemplates the combination of a verbal educational text with the written text on the sheets. Thus, the acoustic reproducing apparatus may preferably be a tape player or another sound reproducer, but it will be understood that in accordance with the present invention it will also be possible to combine film strips, slide viewers or other teaching devices with a visible, e.g. printed text in a teaching machine.

Though it will always involve difficulties if the separate parts of the program transporter are moved past the reading area in an incorrect sequence, these difficulties will be much greater when the transporting means is also controlling an apparatus for acoustically or otherwise reproducing educational matter which must be fitted in at certain stages of the basic program. In the use of the device according to the present invention it is therefore essential to ensure that when the printed program is carried on a stack of separate sheets, only one sheet is advanced at a time. In order to achieve this the lockable case is provided with an opening or a transparent area through which a pagination or page number at the lower edge of the sheets is visible, whereby it will be possible at an early stage of the advancement of a new sheet and at any rate before the sheet is caught by the feeding control means, i.e. while retraction of the sheet is still possible, to ascertain that only the top sheet is advanced.

The non-reversible feeding control means is so constructed that a shaft actuating the feeding control means in engagement with the program strip or sheet is mounted, at least at one end, on or in a journal bearing rod, and that between the journal rod and the shaft there is provided a coupling which affords a fixed connection when the journal rod is rotated in a direction corresponding to the advancement of the strip, but is released when the journal rod is rotated in the opposite direction. The coupling is preferably a screw-threaded joint which involves engagement of merely one or a few threads when engaged.

Further features of the teaching device according to the present invention will be evident from the following description, reference being had to the accompanying drawings, which illustrate an embodiment of the teaching device of the present invention.

In the drawings:

FIG. 1 is a diagrammatical plan view of the teaching device according to the present invention, with certain parts cut away.

FIG. 2 is an exploded view in vertical section substantially along the line II—II in FIG. 1.

Figure 3:
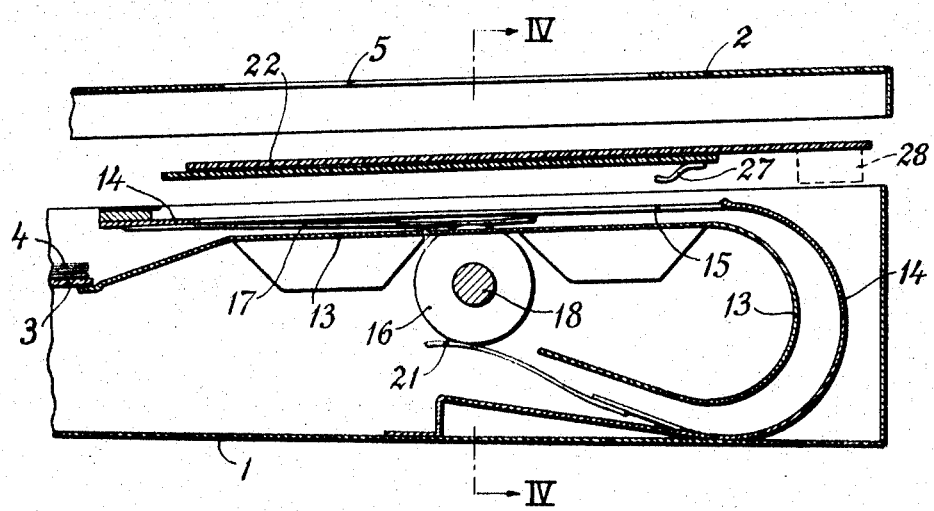
FIG. 3 is a diagrammatical view of the upper part of FIG. 2 on a larger scale.

The device illustrated comprises a lockable case consisting of a base portion 1 and a cover plate 2. The locking mechanism is not illustrated. A removable horizontal partition 3 divides one end of the space above the base portion 1 into an upper compartment for a stack of program sheets 4 which are to be advanced forwardly one at a time past a reading area 5 in the cover plate 2, and a lower compartment for sheets 6 which have already been advanced past the reading area 5, and on which the student may have written his answers to problems contained in the program and have traveled around the end of the case. The sheets 4 are advanced forwardly a first distance by means of a contact finger 7, which is attached to the extremity of a leaf spring 8 and can be forced into engagement with the upper surface of the top sheet by means of a hand-operated knob 9 against the spring action. At the end remote from the friction finger 7 the leaf spring 8 is secured to a bar 10 which is guided inside the cover plate 2 so as to be slidable forward in the feeding direction by means of the knob 9, the knob 9 being connected to the spring 8 by a member extending through a slot 11 in the cover plate 2 and a recess in the bar 10.

When the knob 9 is pressed down and advanced along the slot 11, the friction finger 7 will engage the top sheet 4 and push it forward. Over the position on a sheet at which the sheets are paginated or have the sheet number the cover plate 2 is provided with a small opening 12. The pagination of the uppermost sheet remaining in the stack will appear in the opening 12 as soon as the overlying sheet has been pushed forward a short distance by means of acting on the knob 9. Thus, through the opening 12 the student may at once ascertain whether the finger 7 has caught one or more sheets. If more sheets than desired have been caught, the sheets may be returned by means of acting on the knob 9. Another attempt to advance only one sheet may then be made, after some shaking of the device. As a rule, many attempts will not be required to loosen and leave behind a sheet which is sticking to the bottom side of the desired sheet; however, in the rare cases in which the sheets adhere strongly to each other, the teacher may unlock the device and separate the sheets at an early stage and before any of the sheets have passed the reading area 5.

Figure 4:
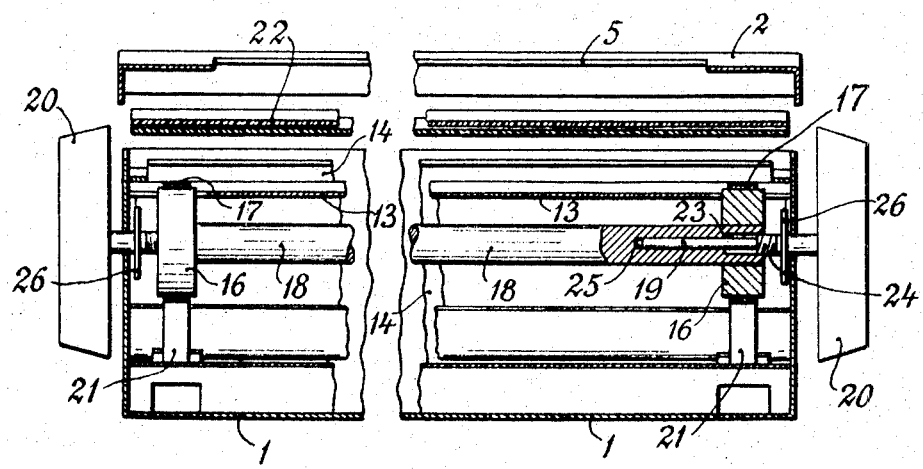
FIG. 4 is a tranversal vertical section substantially along the line IV—IV in FIG. 3.

The friction finger 7 pushes the sheet between a conducting backing plate 13 and an upper plate 14 having an opening 15 which is located directly under the reading opening 5 in the cover plate 2 and has substantially the same size as this opening. When the front edge of the sheet has reached a position about half-way across the reading opening 5 defining the reading area, it is engaged at each side edge by a feed wheel 16, which projects above the backing plate 13 and against which the sheet is forced by leaf springs 17. The feed wheels 16 are fixedly mounted at opposite ends of axially bored shaft 18 supported on rod journals 19 for free rotation in both directions. However, from the outside of the device the shaft 18 can only be turned in the advancing forward direction because the connections between the shaft and exterior operating knobs 20 are designed in a special way which will be described in more detail later in the specification, reference being had to FIG. 4.

The feed wheels 16 now carry the sheet on past the reading area 5 through the passage formed between the plates 13 and 14. At the end of the reading area 5 the guiding plates 13 and 14 are curved to define a passage returning the sheet under the feed wheels 16. In this position a leaf spring 21 is provided in cooperation with each feed wheel so as to force the sheet against the feed wheels 16, whereby the sheet on having passed the reading area 5 moves on into the compartment below the horizontal partition 3.

In order to make the program sheet 4 which has passed the reading area inaccessible through the opening 5 in the cover plate 2, a cover glass 22 is provided between the upper curved plate 14 and the cover plate 2. The cover glass 2 may for instance consist of a transparent acrylic resin and, if desired, be provided with a writing opening. The cover glass 22 is preferably two layer with an opening permitting insertion of removable masks for covering part of the reading area 5.

The rod bearing journals 19 supporting the shaft 18 carrying the feed wheels 16 extend through the side walls of the base 1. The operating knob 20 is secured to the extremity of the journal rod 19. A portion of the axial bore in the shaft 18 is provided with internal screw-threads 23 cooperating with a threaded portion 24 on the journal rod 19. The length of the journal rod 19 is such that the journal rests in the bore in the shaft 18 when only one or some of the threads of the threads 23, are in engagement with threads 24. This affords a firm connection sufficient for overcoming the small resistance against advancement offered by the sheet, the friction in the threaded joint 23, 24 being at the same time too small to turn the shaft 18 in the reverse direction corresponding to a withdrawal of the sheet, so that the threaded joint 23, 24 will unscrew when the operating knob 20 is rotated in this reverse direction. For further reduction of the static friction, the end face of the journal rod 19 rests against a ball 25. It will be understood that the two threaded portions 23, at the opposite ends of the shaft 18 are threaded in opposite directions, that is, one of the threaded portions comprises a left hand thread and the other a right hand thread, so that both the operating knobs 20 have the same effect on the feed wheels 16, and either of the knobs 20, or both, may be acted upon for advancing the program sheet forward.

Between the feed wheels 16 and the side walls of the base 1 each journal rod 19 is provided with an abutment member in the form of a stopping disk 26 (FIG. 4) permitting an axial movement of the journal rod sufficient for unscrewing the threads 23 and 24, but preventing the journal rod from being moved out of the bore in the shaft 18.

As illustrated in FIG. 3, the cover glass 22 carries a first spring contact finger 27 engaging the program sheet 4 and urging it against the acking plate 13. A first series of holes through which the spring contact finger 27 may close an electric starting circuit by contacting the backing plate 13 may be provided in the sheet.

This electric circuit starts a reproducing apparatus, e.g. a tape player playing a text having relation to the text just studied or still visible in the reading area. When the desired matter has been reproduced, the reproducing apparatus may be stopped automatically by means of a signal or a marking carried by the means containing the reproduced matter. In the case of a tape player, the tape may carry a recorded signal which stops the player, or the tape may carry a short metal strip which closes an interrupter circuit. Immediately after the reproducing apparatus has been started, the starting circuit is preferably switched from the first spring contact 27 responsible for the starting, to a second similar spring contact 27 arranged in the path of a second row of holes in the sheet. Thereby the starting circuit is interrupted and will not become closed anew until the program sheet has been further advanced and a hole in the said second row permits the said second spring contact to engage the backing plate 13. The reproducing apparatus is now started anew, and the starting circuit is switched to the first spring contact 27.

Hence, program strips or sheets for use in combination with a reproducing apparatus will have two rows of holes extending in the direction of feed and aligned respectively with one of the two contact springs 27, the holes in the two rows being at the same time staggered in the longitudinal direction. From the above explanation it will be apparent that when there is no strip or sheet in the reading area, the starting circuit will be permanently closed. In order to avoid this a third spring contact is provided which short-circuits the starting circuit and prevents starting of the reproducing apparatus. This third contact preferably has two contact points, one somewhat ahead of and the other somewhat behind the starting contacts as viewed in the direction of feed.

The relays necessary for switching the electric circuits referred to above may be provided on the cover glass 22, for instance as indicated at 28.

Figure 5:
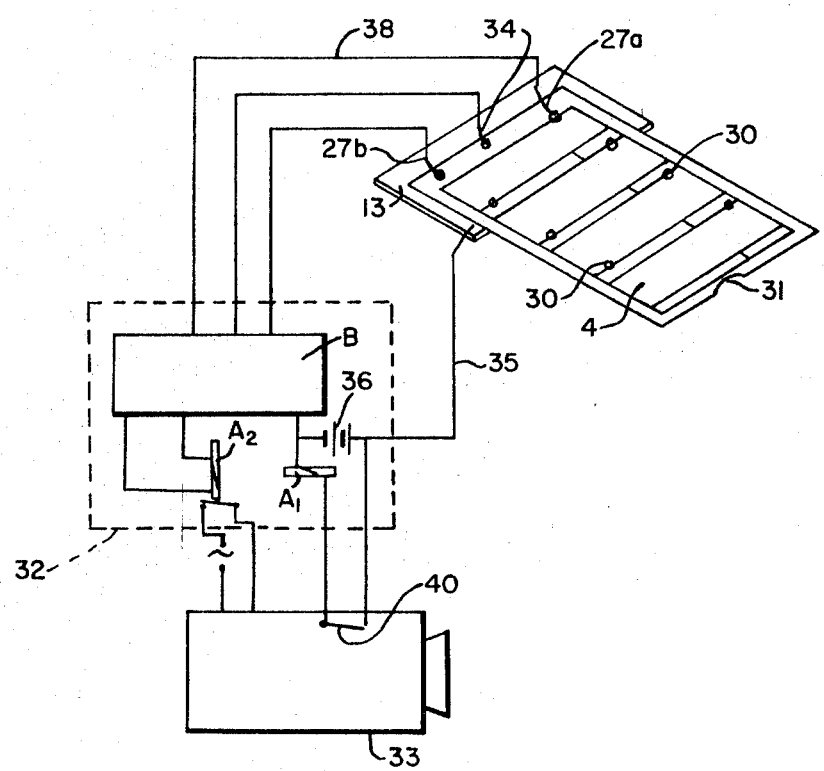
FIG. 5 shows auxiliary control apparatus for reproducing the educational matter on the carrier sheet.

FIG. 5 shows auxiliary control apparatus for reproducing the educational matter on the carrier sheet 4 which has two lateral series of holes 30, 30, and a terminal arcuate cut-out 31. The two lateral series of holes 30 are respectively engageable with switch contacts 27a, 27b which make contact through the holes with backing plate 13.

Switch contact 34 makes contact with plate 13 through cut-out 31, control unit 32 includes a switching unit B and a relay winding A2 controlling a switch contact, which closes an actuating power circuit to a reproducer 33 such as a tape player which has a control switch 40 connected to the winding of a relay A1 in control unit 32.

A battery 36 is connected between one terminal of the winding of relay A1 and plate 13. These switches and relays control the operation of the reproducing apparatus 33 in accordance with the holes in sheets 4.

In case it is desirable that the answers to the problems should be written on a separate sheet material, for instance on a continuous paper strip, this strip may be mounted for advancement in a case similar to the one illustrated and be connected to the feeding means of this device in such a manner that the answer will have passed the writing area (but not necessarily the reading area) when the correct answer appears in the reading area 5, so that the answer cannot be corrected.

I claim:

1. A teaching device comprising a lockable case, a carrier of sheet material in a stack, having visible educational matter contained in said case, feeding means for advancing the said carrier past a reading area, said feeding means being only capable of moving the carrier forwards, auxiliary apparatus for reproducing educational matter, said carrier having markings, and starting means actuatable by said carrier markings for starting said auxiliary apparatus for reproducing said educational matter which is provided with markings, and said auxiliary apparatus being adapted to be stopped by said markings on said education matter, characterized in that said markings on said carrier are positioned in a staggered relation in a first and a second of two lines extending in the direction of feed, separate sensing means for each of these lines, auxiliary control means, said apparatus being so arranged that after one of the sensing means has sensed a carrier marking and caused starting of the reproducing apparatus, said auxiliary control means makes this sensing means inoperative, but enables the other sensing means to sense the next carrier marking which is positioned in the line for this other sensing means.

2. A teaching device as claimed in claim 1, said carrier having apertures, and the said sensing means comprising spring contacts which are closed through said apertures in the carrier.

3. A teaching device as claimed in claim 2, and a backing plate over which the carrier is passed at the location of the reading area, the spring contacts being mounted above the carrier to contact through said carrier apertures said backing plate.

4. A teaching device as claimed in claim 3, and means for making the said two contacts inoperative when there is no carrier at the location of the contacts.

5. A teaching device as claimed in claim 1, characterized in that the reproducing apparatus is a sound reproducer.

References Cited

UNITED STATES PATENTS

| | | | |
|---|---|---|---|
| 1,291,608 | 1/1919 | Newsom. | |
| 3,046,675 | 7/1962 | Schure | 35—9 |
| 3,106,026 | 10/1963 | Jackson et al. | 35—9 |
| 3,126,646 | 4/1964 | Penraat | 35—9 |
| 3,146,532 | 9/1964 | Shwisha et al. | 35—9 |
| 3,210,864 | 10/1965 | Tillotson et al. | 35—9 |
| 3,228,118 | 1/1966 | Hirtle | 35—9 |
| 1,504,256 | 8/1924 | Marcuson | 270—58 |

EUGENE R. CAPOZIO, Primary Examiner

WALTER W. NIELSEN, Assistant Examiner